United States Patent
Vallicella

[15] 3,683,617
[45] Aug. 15, 1972

[54] COMBINED TREE SHAKER AND FRUIT HARVESTER

[72] Inventor: Rolando Mario Vallicella, Route 2, Box 562, Bakersfield, Calif. 93302

[22] Filed: May 5, 1971

[21] Appl. No.: 140,382

[52] U.S. Cl. .................................................56/329
[51] Int. Cl. ............................................A01g 19/06
[58] Field of Search..............56/328 R, 328 TS, 329

[56] References Cited

UNITED STATES PATENTS

| | | | |
|---|---|---|---|
| 2,714,281 | 8/1955 | Steele | 56/329 |
| 3,412,539 | 11/1968 | Gilbert et al. | 56/329 |
| 3,522,696 | 8/1970 | Millier et al. | 56/328 R |
| 3,596,455 | 8/1971 | Adrian | 56/329 |
| 3,623,308 | 11/1971 | Nye | 56/329 |

*Primary Examiner*—Russell R. Kinsey
*Attorney*—William C. Babcock

[57] ABSTRACT

A combined tree shaker and fruit harvester of such width as to be movable longitudinally in the spaces between trees having the trunks thereof arranged in rows. The harvester when moved to a position opposite a particular tree has a fruit deflector so supported thereon that the deflector extends under a portion of the branches of the tree.

The harvester also includes a transversely movable carriage that has power driven shaker means, a pair of conveyers and expandable deflector means mounted thereon. When the harvester is oppositely disposed to a tree, the carriage is moved transversely for the shaker means to removably engage the trunk thereof, and the deflector means then expanded to cooperate with the deflector on the harvester to provide a continuous surface that extends under the branch of the tree.

The deflector and deflector means cooperate to define a continuous surface of such configuration that as fruit fall thereon the fruit roll by gravity to the pair of carriage supported conveyers. The pair of carriage supported conveyers raise the fruit and deposit the latter on longitudinally extending conveyer means supported on the harvester. The conveyer means transport the fruit deposited thereon to a first end of the harvester, where the fruit drops therefrom by gravity, and may be alternately and selectively discharged into either of two containers that are removably supported from the harvester. The harvester may be operated continuously, for as one container is filled it is removed from the harvester and replaced by an empty container.

The carriage, conveyers and shaker move transversely as a unit relative to the wheel supported chassis that forms a part of the harvester, and the carriage when occupying a first position on the chassis is of such width as to permit the harvester to be moved on a highway from orchard to orchard.

11 Claims, 11 Drawing Figures

INVENTOR.
ROLANDO M. VALLICELLA
BY
William G. Babcock
ATTORNEY

COMBINED TREE SHAKER AND FRUIT HARVESTER

BACKGROUND OF THE INVENTION

1. Field of the Invention

A combined tree shaker and fruit harvester.

2. Description of the Prior Art

In the past various types of fruit harvesters and tree shaking devices have been evolved and used to a limited extent in the harvesting of fruits, nuts and the like. Such prior art devices have the operational disadvantages that in the main they are bulky, unduly complicated and require an excessive personnel to operate. Furthermore, such devices are frequently of such size that they cannot be transported from place to place on highways without being at least partially dismantled. Also, such prior art devices have required difficult and time-consuming manipulation in the orchards in which they are used, prior to fruit from a tree being harvested.

The primary purpose in devising the present invention is to provide a combined tree shaker and fruit harvester of such size as to be longitudinally and intermittently moved in the spaces between trees having the trunks thereof arranged in rows, and the harvester when oppositely disposed to a tree, having a carriage that may be moved transversely to place a power driven shaker in gripping contact with the trunk of a tree. The harvester includes fruit deflecting means that may be disposed to extend under the trunk of the tree so engaged so that when the shaker is actuated the fruit falling on the shaker is directed to transversely positioned conveyors, and the conveyors in turn transporting the fruit to conveyor means on the harvester that carry the fruit longitudinally thereon to sizer means. The fruit after being sized is alternately dischargable onto either of two containers. By such alternate discharging of the fruit into the container, the harvester may be operated continuously, for as one container is filled it is removed and replaced by an empty container, and the fruit during this replacement operation being discharged into the second of the two containers.

A further object in devising the present invention is to supply a combined tree shaker and fruit harvester that is not only sufficiently compact as to be movable in the spaces between rows of trees in an orchard, but is of such size and width as to be movable on a highway to permit the harvester to travel from orchard to orchard.

SUMMARY OF THE INVENTION

A combined harvester and tree shaker that includes an elongate wheel supported chassis that is longitudinally movable in the spaces between rows of trees in an orchard. The harvester includes a first elongate longitudinally extending deflector that may be disposed under a portion of the branches of the tree opposite that to which the harvester is positioned. First power driven longitudinally extending fruit conveyor means are mounted on the chassis under the deflector. At least one transverse rail is pivotally supported from the chassis under the first deflector, with the rail serving to support a transversely movable carriage that includes two laterally spaced endless belt conveyors. The carriage also supports two spaced power driven shakers that may removably engage opposite sides of the trunk of the tree from which fruit is to be harvested. The harvester includes first, second and third power means for use in transversely moving the carriage conveyors and shaker, for pivoting said rail and carriage to the extent that the shakers may engage the trunk at a desired elevation, and for moving said shakers into gripping engagement with the trunk of a tree. The transversely movable conveyors serve to movably support two pliable deflector sheets that may be expanded to extend under the branches of the tree, with these deflector sheets and the deflector cooperating to define a continuous surface under the branches that is of such configuration that when fruit drops thereon as the shaker is actuated, the fruit rolls by gravity into the carriage supported conveyors.

The conveyors when actuated transport the fruit to the chassis supported conveyor means, which conveyor means in turn transport the fruit towards a first end of the chassis where sizing means are provided. The fruit after being sized is selectively discharged into either of two containers. By such selective discharge, the harvester may be operated continuously for after one container is filled, it may be replaced by a second empty container, and during the replacement operation the sized fruit is discharged into the first of the two containers. The transversely positioned rail and carriage assembly associated therewith are of such width that when the rail and carriage occupy a first position on the chassis, the overall width of the harvester is such as to be within the legal limits for transporting the harvester by power means on a public highway, which is highly desirable when the harvester is being moved from orchard to orchard.

A major object of the present invention is to supply a combined tree shaker and harvesting device of such size and width as to be movable on public highways from orchard to orchard, and the harvester upon reaching an orchard capable of being moved longitudinally through the spaces between rows of trees therein. The combined tree shaker and harvester when disposed opposite a particular tree may be utilized to not only shake the tree, but harvest the fruit dropping therefrom by gravity, and sizing the fruit, prior to the fruit being discharged into containers removably supported from the harvester.

DESCRIPTION OF THE PREFERRED EMBODIMENTS

Figure 2:
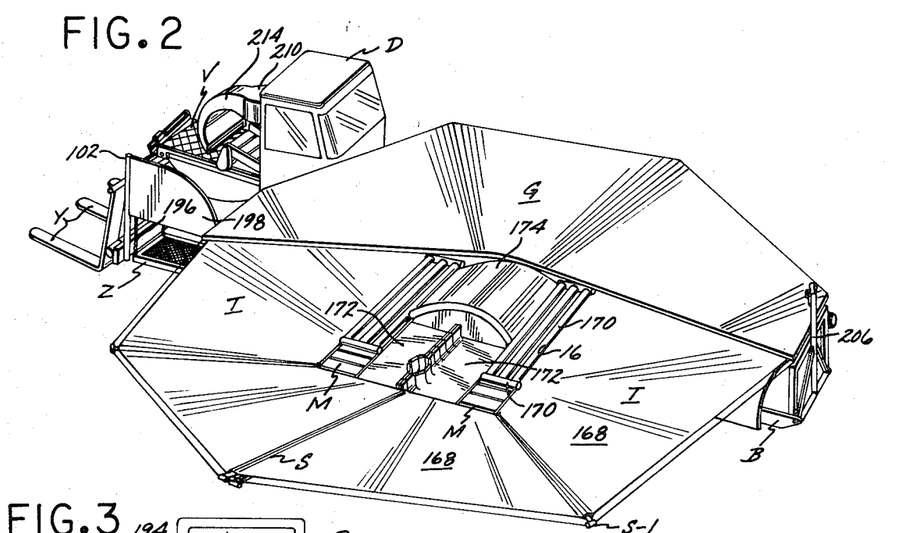
FIG. 2 is a perspective view of the device shown in FIG. 1, but with the deflector means expanded to extend under the branches of a tree that is removably gripped by the shakers that form a part of the harvester.
Figure 3:
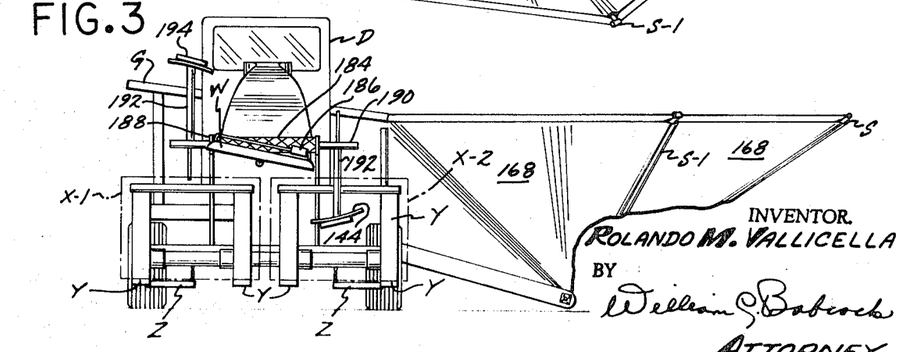
FIG. 3 is a rear elevational view of the harvester, with the deflector means in a fruit gathering position.
Figure 4:
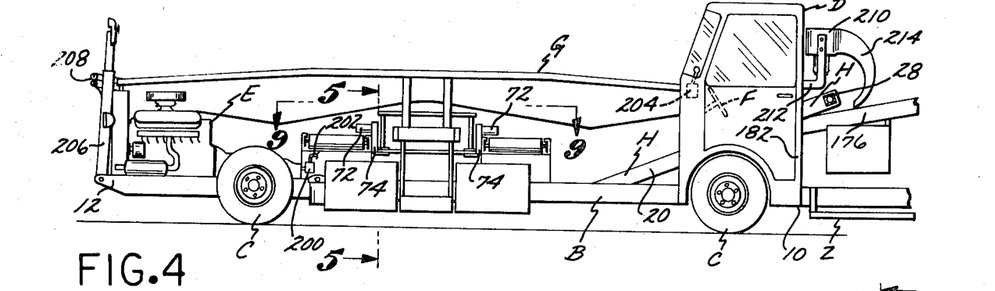
FIG. 4 is a side elevational view of the device.

The combined tree shaker and fruit harvesting device A as may best be seen in FIGS. 1 to 4 and 9 and 10 includes an elongate chassis B that is supported on at least two pairs of longitudinally spaced, pneumatic-tired wheels C. The chassis B has first and second ends, with a cab D preferably being provided adjacent the first end 10 as shown in FIG. 4.

The chassis B adjacent the second end 12 thereof supports a prime mover E that is illustrated as being an internal combustion engine. The wheels C adjacent the second end 12 of the chassis are guidable by a steering mechanism F of conventional design that is manually operable from the cab D. The prime mover E by transmission means (not shown) of a conventional nature, are adapted to drive at least the wheel C adjacent the first end 10 of the chassis, to move the chassis longitudinally along a space defined by the trees that have the trunks thereof arranged in rows.

A longitudinally extending fruit deflector G is supported from the chassis B by a number of uprights H that extend upwardly from the chassis B. The deflector G is formed from a sufficiently rigid material as to be dimensionally stable, and is positioned sufficiently low on the chassis as to be disposed under the major portions of the branches of a tree (not shown) when the device A is moved opposite thereto. From experience, it has been found that fruit such as peaches and the like are not damaged when they fall from the tree onto the deflector G, even though the deflector G is relatively rigid. Major damage to fruit such as peaches in dropping from the tree occurs when one peach drops onto another already fallen peach. The chassis B movably supports a first longitudinally extending fruit conveyor means H as may best be seen in FIGS. 1, 4 and 10, which conveyor means includes a portion that extends upwardly towards the first end 10 of the chassis. The chassis B also supports two laterally spaced, L-shaped uprights J as can best be seen in FIG. 5, and these uprights in turn pivotally support a pair of transverse rails K. The rails K movably support a carriage L best seen in FIGS. 5 and 6, with the carriage supporting two transverse laterally spaced endless belt conveyors M. The carriage L also between the conveyors M pivotally support two power driven shakers N which when the carriage L is in the second position shown in FIG. 10 may removably engage opposite sides of a tree trunk 0.

Figure 9:
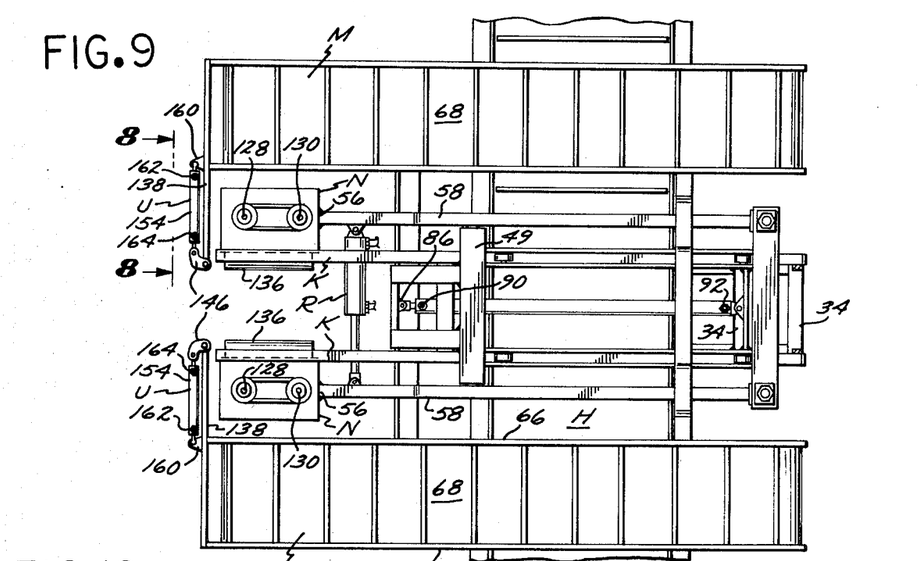
FIG. 9 is a top plan view of the device with the carriage, shakers and transverse conveyors in a first position that they occupy when the device is being moved from tree to tree or on the public highway.
Figure 10:
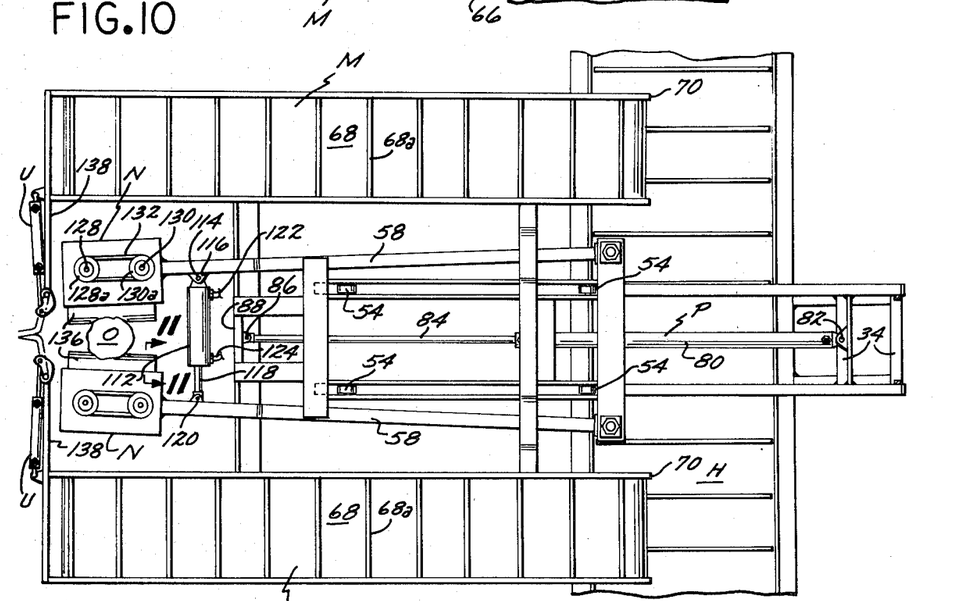
FIG. 10 is the same top plan view as shown in FIG. 9, but with the carriage, shakers and transverse conveyors occupying a second position in which they are at least partially disposed under the branches of the tree from which the fruit is to be harvested.

First power means P are provided as may best be seen in FIG. 9 for concurrently moving carriage L, transverse conveyors M, and shakers N transversely on the chassis B from the first position shown in FIG. 9 to the second position shown in FIG. 10. Second power means Q are also provided on the chassis B for pivoting the rails K to allow the shakers N to grip the trunk 0 at a desired elevation when the carriage L is in the second position illustrated in FIG. 10. Third power means R are also provided on the device A for moving the shakers N towards and away from one another to grip the trunk 0 with a desired degree of intensity when the carriage L is in the second position shown in FIG. 10.

Figure 1:
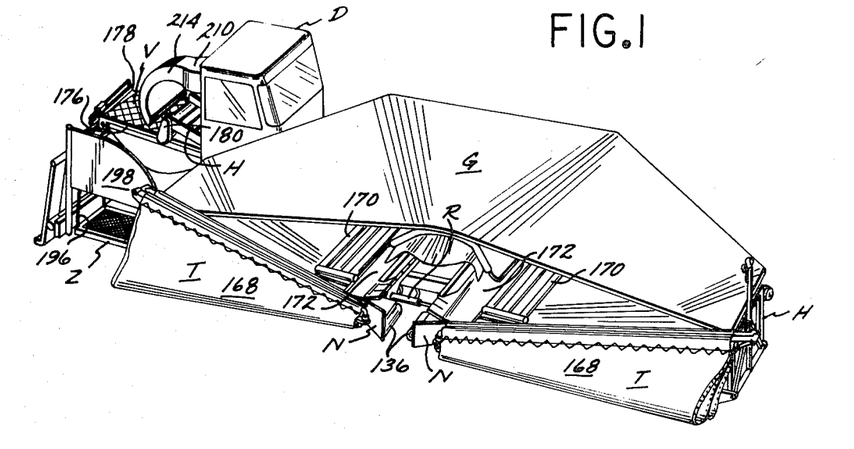
FIG. 1 is a perspective view of the combined tree shaker and harvester in a first position in which it is moved longitudinally in the space between rows of trees in an orchard.

Two sets of elongate supports S are pivotally mounted on the conveyors M adjacent the shakers N, and these supports having pliable sheets T secured thereto as shown in FIGS. 1 and 2 that may be expanded to extend under the branches of the tree that has the trunk 0 thereof engaged by the shakers N.

The deflector G and deflector sheets T when fully expanded provide a continuous surface that is illustrated as being of a generally octagon shape and having an opening 16 in the center thereof. The upper surface of the deflector G and deflector sheets T when expanded as shown in FIG. 2 slope downwardly and inwardly to cause fruit (not shown) deposited thereon to roll downwardly by gravity onto the transverse conveyors M. Power means U are provided on the chassis for driving the conveyor H and transverse conveyors M, to transport fruit (not shown) deposited on the transverse conveyors upwardly thereon to positions above the conveyor means H, with the fruit dropping onto the conveyor means H and being transported thereby toward the first end 10 of the chassis B. The fruit (not shown) after reaching the end of the conveyor means H most adjacent the first end 10 of the chassis, drops from the conveyor means onto sizing means V. The sizing means V permits fruit smaller than a predetermined size to drop downwardly therethrough onto the ground surface.

The sizing means V moves the fruit longitudinally to a position where the fruit drops therefrom by gravity into a transverse pivotally supported chute W best seen in FIG. 3. First and second boxes X–1 and X–2 are by power operated fork means Y supported on the first end 10 of the chassis, and the chute W permitting sized fruit to be selectively discharged into either of the boxes X–1 or X–2. Such selective discharge is highly desirable, for when one of the boxes X–1 or X–2 is full, the sized fruit may be discharged into the other box to permit continuous operation of the harvesting device A. By such selective discharge, time is permitted to replace one of the filled boxes X–1 or X–2 with an empty box, and alternate filling of the boxes X–1 and X–2 may continue without stopping the operation of the harvester A. The chassis B preferably supports a horizontal platform Z on which a person may stand, to manually select oversized fruit that may be of premium value from the fruit on the sizer V, and prior to the fruit being discharged onto one of the boxes X–1 or X–2.

Figure 5:
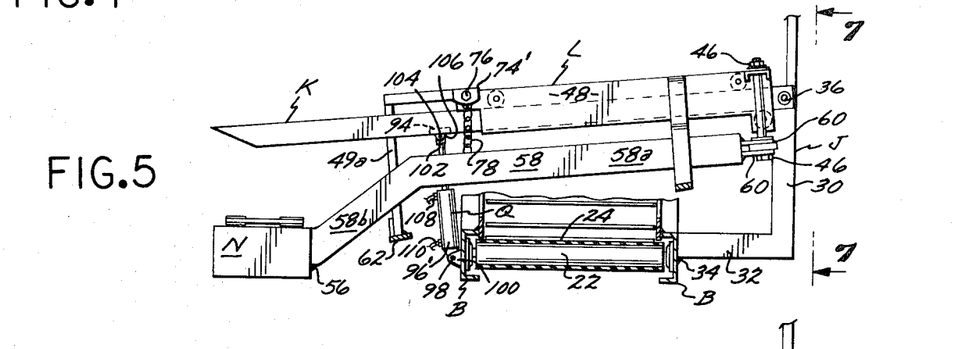
FIG. 5 is a transverse cross sectional view of the device taken on the line 5—5 of FIG. 4, with the carriage in a first position.
Figure 6:
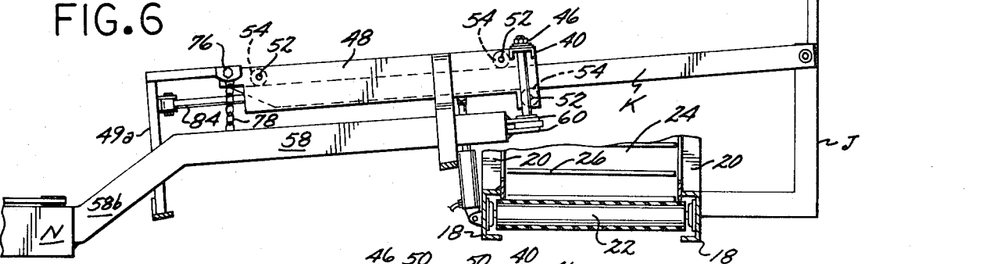
FIG. 6 is the same transverse cross sectional view as shown in FIG. 5, but with the carriage and shakers in a second position, where the shakers may removably engage the trunk of a tree.

The chassis B as may best be seen in FIGS. 4, 5 and 6 is defined by two laterally, spaced parallel structural members 18 which are illustrated as being of channel-shaped cross section. The pneumatic-tired wheels C are connected to the chassis C by conventional means (not shown). The members 18 towards the first end 10 of the chassis have two laterally spaced, parallel structural members 20 extending upwardly therefrom. The members 18 and 20 serve to rotatably support a number of transversely positioned longitudinally spaced rollers 22 as may best be seen in FIGS. 5 and 6 and these rollers serving to rotatably support an endless conveyor belt 24 that has spaced transverse cleats 26 extending outwardly from the exterior surface thereof.

The members 20 at their junction with the members 18 extend inwardly over the conveyor belt 24 to prevent it being dislodged from the rollers, as the belt angles upwardly towards the first end 10 of the chassis. A hydraulic motor 28 is mounted on the free extremity of one of the members 20, and is connected to one of the rollers 22 by conventional means (not shown) to drive the same. The upper reach of the conveyor belt 24 is driven in a direction so that it at all times moves towards the first end 10 of the chassis B.

Figure 7:
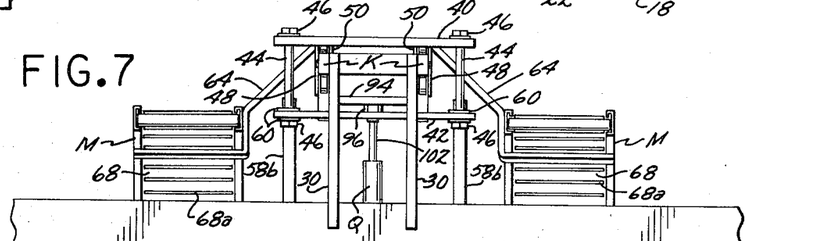
FIG. 7 is a fragmentary side elevational view of a portion of the device taken on the line 7—7 of FIG. 5.

Each of the uprights J includes a vertical leg 30 as may best be seen in FIGS. 5 and 6 and a horizontal leg 32 that has the free end thereof secured to one of the chassis members 18 by welding beads 34 or other suitable fastening means. The legs 30 are connected by reinforcing cross pieces 34 as may best be seen in FIGS. 9 and 10. Each of the legs 30 as can best be seen in FIGS. 5 and 6 serves by a pin 36 to pivotally support one of the rails K. The carriage L as may best be seen in FIGS. 5 to 7 inclusive includes two horizontal vertically-spaced cross pieces 40 and 42 that are joined at their ends by a pair of heavy vertical rods 44. The rods 44 are secured to the cross pieces 40 and 42 by nuts 46 or other fastening means. The cross piece 40 has two pairs of vertical plates 48 and 50 secured thereto that extend outwardly therefrom, with each pair of plates being disposed on opposite sides on one of the rails K. Each of the plates 48 has a number of stub shafts 52 projecting therefrom as shown in FIGS. 6 and 7, and these shafts serving to rotatably support rollers 54 that are situated both above and below one of the rails K. The rollers 54 allow horizontal movement of the carriage L on the rails K, but prevent any appreciable vertical movement of the carriage relative to the rails.

Each of the shakers N as can best be seen in FIGS. 5, 7, 9 and 10 is supported on a first end 56 of a rigid member 58. Each member includes a first elongate section 58a and second section 58b that is angularly disposed to the first section, and the second section supporting one of the shakers. The free end of each section 58a has two laterally spaced lugs 60 projecting therefrom that pivotally engage a lower end of one of the rods 44 as best seen in FIGS. 5 and 6. Each of the plates 48 on the portion thereof most adjacent the shakers N is connected to a cross piece 49 that supports two spaced downturned L-shaped sections 49a that have the lower ends thereof secured to a longitudinally extending channel iron 62.

The carriage L has two arms 64 extending outwardly in opposite directions from the plates 48, and these arms in cooperation with the channel iron 62 serving to support the two conveyors M as best seen in FIGS. 7, 9 and 10.

Each of the conveyors M is defined by two elongate laterally spaced transverse rigid members 66 that are held in fixed positions by the arms 64 and channel iron 62. The members 66 rotatably support a number of spaced cylindrical rollers thereon (not shown) on which an endless belt 68 is mounted. Each of the belts 68 has a number of cleats 68a that extend outwardly from the exterior surface thereof, and serve to move fruit deposited on the belt upwardly towards the conveyor means H. The conveyors M at all times have portions thereof that are situated above the conveyor means H and below the first deflector G as may be seen in FIG. 4. Each of the conveyors M is provided with a hydraulic motor 72 shown in FIG. 4 that by a transmission 74 drives the belts 68 in a direction to deposit fruit on the conveyor means H when the carriage is in the second position shown in FIG. 10.

Each of the plates 48 has a bracket 74' of downturned L-shaped transverse cross section projecting outwardly therefrom, which bracket supports a bolt 76 that has a chain 78 depending therefrom as shown in FIG. 5. The lower ends of the chains 78 are secured to the members 58, to permit the members 58 to pivot on the rods 44. Such pivotal movement of the members 58 permits the shakers N to be moved laterally relative to a trunk 0 as shown in FIG. 10.

The first power means P as may best be seen in FIG. 10 is used for moving the carriage L, conveyors M, and shakers N transversely as a unit relative to the chassis B. The first power means P includes an elongate hydraulic cylinder 80 that has a first end thereof pivotally secured to one of the cross pieces 34 by a pin 82. A piston rod 84 is slidably movable in the cylinder 80, and with the free end of the piston rod being pivotally connected by a pin 86 to a cross piece 88 that extends between the members 49a. Hydraulic fluid under pressure may be discharged into the interior end portions of the cylinder 80 through connections 90 and 92 as shown in FIG. 9 to move the piston rod relative to the cylinder 80, and with the piston rod as it moves also moving the carriage L, conveyors M and shakers N.

The rails K have a cross piece 94 extending therebetween as shown in FIGS. 5 and 7 that has two laterally spaced lugs 96 projecting downwardly therefrom. The second power means Q includes a hydraulic cylinder 96' that has the lower end thereof pivotally connected by a pin 98 to lugs 100 that extend outwardly from the chassis B. The cylinder 96 has a piston rod 102 extending upwardly therefrom that is pivotally connected to a pin 104 that extends through a pair of spaced lugs 106 that project downwardly from the cross piece 94. Hydraulic fluid may be discharged into and out of the hydraulic cylinder 96 through connections 108 and 110 to move the piston rod 102 upwardly and downwardly relative to the chassis B. Such movement of the piston rod 102 results in pivotal movement of the rails K, and as the carriage L is moved on the rails, the shakers N and the outwardly disposed ends of the conveyors M may be positioned at a desired elevation relative to the trunk 0 of the tree that is to have fruit shaken therefrom.

Figure 11:
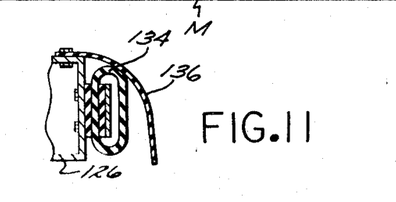
FIG. 11 is a fragmentary cross sectional view of the device taken on the line 11—11 of FIG. 10.

Third power operated means R are provided in the form of a hydraulic cylinder 112 as can best be seen in FIG. 9 that has a first end thereof pivotally connected by a pin 114 to two spaced lugs 116 that project outwardly from one of the members 58. The cylinder 112 slidably supports a piston rod 118 that has the free end thereof pivotally connected by a pin 120 to the one of the members 58 that does not have the lugs 116 mounted thereon. Hydraulic fluid under pressure may be discharged into and out of the hydraulic cylinder 112 through connection 122 and 124 to pivot the members 58 and shakers N supported thereon either towards or away from one another. By pivoting the members 58 towards one another, the shakers N may be urged into gripping contact with opposite sides of trunk O as shown in FIG. 10. The shakers N may be of a variety of designs, but as illustrated in the drawings, each include a hollow box 126 that has two shafts 128 and 130 rotatably supported thereon, with the shaft 128 supporting an eccentrically mounted weight (not shown). The shafts are provided with pulleys 128a and 130a that are engaged by an endless belt 132. When shaft 130 is driven by a motor (not shown), the shaft 128 and eccentric weight (not shown) are rotated, and the shaker N imparts a strong vibrating movement to a resilient pad 134 as shown in FIG. 11, that has a protecting resilient sheet 136 extending downwardly thereover. The sheets 136 are in pressure contact with the trunk O when the shakers N are disposed as shown in FIG. 10.

Figure 8:
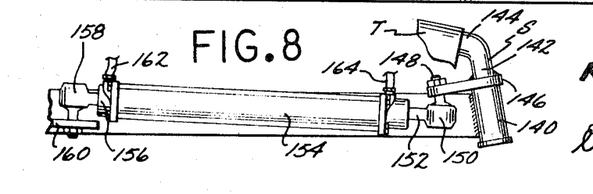
FIG. 8 is a fragmentary side elevational view of a portion of the device taken on the lin 8—8 of FIG. 9.

The conveyors M as may best be seen in FIG. 10 have arms 138 on the most outwardly extending portions thereof as shown in FIGS. 8, 9 and 10. The arms 138 at their most adjacent ends support two angularly disposed cylindrical cups 140, with each of these cups rotatably supporting one of the supports S. Each of the supports S includes a straight cylindrical portion 142 that is mounted in one of the cups 140 and an angularly disposed section 144. The sections 144 extend away from one another and are substantially parallel to the chassis B when the deflector sheets T are folded into the compact configuration shown in FIG. 1. Each of the support portions 142 has a lug 146 welded or otherwise rigidly secured thereto, which lug on its outer end is secured to a shank 148 that forms a part of a ball and socket assembly 150 that is mounted on the outwardly projecting end of a piston rod 152 that is slidable within a hydraulic cylinder 154. The cylinder 154 has an end 156 connected to a ball and socket assembly 158 of conventional design, that is secured to a lug 160 that projects outwardly from one of the arms 138. Hydraulic fluid under pressure may be discharged into the interior end portions of each cylinder 154 through connections 162 and 164 to cause pivotal movement of the supports 5 from the position shown in FIG. 1 to that shown in FIG. 2.

The second supports S-1 are of substantially the same structure as the supports S and are also pivotally supported from the arms 138 in the same manner as the supports S. Supports S-1 have no lugs 146 mounted thereon. Sheets of pliable material 168 are connected to the supports S, S-1 and to the deflector G as shown in FIGS. 1 and 2, and with the sheets 168 cooperating with the supports S, S-1 and deflector G to form a continuous surface under the tree (not shown) when the carriage is in the second position, and the sheets expanded as shown in FIG. 2. After fruit has been harvested from a tree by dropping therefrom due to the action of the shakers N, and fallen onto sheets 168 or deflector G and subsequently rolled by gravity to the conveyors M, the sheets 168 are placed in the folded position illustrated in FIG. 1 by actuation of the power means U.

The conveyors M as may best be seen in FIGS. 1 and 2 have a number of elongate tubes or bars 170 supported thereabove, which bars are so laterally spaced that fruit rolling onto them from the deflector G or sheets 168 is slowed down as it passes between the spaces and drops to the conveyors M. The tubes or bars 170 are held in laterally spaced relationship by cross pieces 172, which cross pieces are secured to the conveyors M by conventional means (not shown). Although but one set of tubes or bars 170 is shown in FIG. 2, in practice several layers of the bars may be so arranged that fruit (not shown) rolling by gravity from the sheets T thereon pass between the tubes 170 at a relatively constant rate rather than being dropped onto the conveyor M in groups or bunches.

The members 58 that support the shakers N have deformable heavy rubber sheets 172 or the like mounted thereon as shown in FIGS. 1 and 2, and these sheets assuming the configuration shown in FIG. 2, when the carriage L is in the second position. The sheets 172 when in the position shown in FIG. 2 slope towards the conveyors M, so that fruit dropping onto the sheets will roll by gravity to the conveyors. The conveyors M also have an inverted arch-shaped sheet 174 of rubber or the like extending therebetween, and this sheet due to the convex upper surface thereof directing fruit falling thereon to the tubes or bars 170. Both the deflector G, and the sheets 168 when they are in the expanded position shown in FIG. 2 have all upper surface portions thereof sloping towards the conveyors M, so that fruit falling onto the deflector or sheets will roll by gravity towards the conveyors.

The chassis B on the first end 10 thereof supports a rectangular frame 176 as shown in FIG. 1 that has transverse rollers (not shown) rotatably supported thereon, which rollers engage an endless belt 178 that has openings therein through which undersized fruit may drop by gravity. The previously described elements define the sizer V. One of the rollers rotatably supported in the frame 176 is connected by transmission means 180 to one of the rollers in the conveyor H, and as a result the sizer V is operated concurrently with operation of the conveyor H. The first end 10 of the chassis has a frame 182 that extends upwardly therefrom, and this frame serving to pivotally support the transverse chute W, which chute is so arranged as to receive sized fruit from the sizer V. The chute W has a longitudinally extending rod 184 supported thereabove, and this rod serving to slidably support a weight 186. Pivotal movement of the chute W is limited by two stops 188.

When the weight 186 is moved to one end of the chute as shown in FIG. 3, the chute will be pivoted to a position where the end of the chute most adjacent the weight 186 is at the lowest elevation, and sized fruit discharged into the chute will roll by gravity from that end thereof. The frame 182 and chassis B at the first end 10 thereof cooperate to movably support the two forks Y on which the two boxes X-1 and X-2 are supported. The forks Y may be selectively raised or lowered relative to the frame 182 by conventional power means (not shown). A transverse shaft 190 is pivotally supported by conventional means from the frame 182 and this shaft having two oppositely disposed laterally spaced arms 192 secured thereto, which arms on the lower ends thereof have fruit deflectors 194 affixed thereto. When one of the arms is in the position as shown to the right in FIG. 3, fruit discharged from the chute W falls onto the deflector 194 and then into the box X–2 in which the deflector is situated. In this manner, the fruit drops from the chute W to the box X–2 in steps, and damage to the fruit as a result of these drops is minimized. The frame 182 has chains 196 secured thereto, which chains support the platforms Z on which an individual may stand to manually select oversized fruit from the sizer V. The frame and platform Z cooperate to define a longitudinally extending guard wall 198 that assists a person in maintaining a secure footing on the platform Z.

The use and operation of the invention has previously been explained and the details thereof need not be repeated.

The device A is moved between the spaces between the rows of trees in the form shown in FIG. 1, and when the carriage is transversely aligned with a tree, it is moved transversely to a second position for the shakers N to engage the trunk O as illustrated in FIG. 10 and for the sheets 168 to be expanded as shown in FIG. 2. The shakers N are now actuated to cause fruit to fall from the tree onto the deflector G or deflector sheets 168 with the fruit subsequently rolling by gravity to be discharged onto the conveyors M. As the conveyors M operate, fruit is transferred to the conveyors H, and subsequently transported to the sizer V where undersized fruit is eliminated by dropping through the openings in the belt 178. The belt 178 may be formed from wire mesh or the like. Sized fruit drops from the sizer V onto the chute W, and then is selectively discharged into a desired one of the boxes X–1 or X–2 that is supported on the forks Y.

The forks Y are independently operable, and may be lowered to permit a filled box of fruit to be slipped therefrom, and a new box then mounted on the forks and raised to the position shown in phantom line in FIG. 3. During the sizing operation, oversized or premium fruit may be removed from the sizer by a person standing on one of the platforms Z. After the fruit from a tree has been harvested, the sheets are disposed in the position shown in FIG. 1 and carriage L moved from the second to the first position. The device A may now be moved to the next tree in a row, where the above described harvesting operation is repeated.

Hydraulic fluid under pressure is supplied to the power means previously described as a part of the invention by a hydraulic pump 200 as can best be seen in FIG. 4 that is connected by a conventional power takeoff (not shown) to the engine E. The pump 200 as is conventional with such devices, has a hydraulic fluid reservoir, relief valve, and other such conventional equipment associated therewith, and the pump when operating discharging the hydraulic fluid at a predetermined pressure to a header 202. The header 202 by piping or conduits (not shown) is connected to the power means P, Q, R and the hydraulic cylinder 154, with flow to and from the power means and hydraulic cylinders being controlled by manually operable valve assemblies 204 that are preferably located in the cab D of the device. Valves 204 are also provided to control the flow of hydraulic fluid to the motor 28, and motors 72 used in driving the conveyors H and M, as well as the sizing device V. The forks Y if hydraulically operated are also supplied with hydraulic fluid under pressure from the pump 202. The engine E in addition to powering the pump 202 serves to power at least one set of the wheels C to move the device A from place to place. Should it be desired, a draw bar 206 may be pivotally mounted on the second end 12 of the chassis B, with the draw bar being used to tow the device A on highways. The draw bar 206 when not in use is held in the upwardly extending position shown in FIG. 4 by conventional locking means 208.

To remove chaff and foreign material from the sized fruit, a power driven blower 210 is provided as may best be seen in FIG. 1 that is supported by a bracket 212 from the frame 182, and the blower when actuated discharging a current of air from the open extremity of a curved duct 214 onto the sizer V.

I claim:

1. A device that may be moved longitudinally along a space between trees that have the trunks thereof arranged in rows to sequentially subject each of said trees on one side of said space to a shaking operation to displace fruit therefrom, to harvest fruit shaken therefrom, to size said harvested fruit, and selectively deliver said sized fruit to a desired one of two containers removably supported on said device, said device including:

a. an elongate power operated wheel supported chassis having first and second ends and capable of moving longitudinally and intermittently in said space to a plurality of harvesting positions opposite said trees;
   b. an elongate dimensionally stable fruit deflector longitudinally supported on said chassis and extending under a portion of the branches of a tree when said chassis is in a harvesting position relative thereto;
   c. a first longitudinal fruit conveyor belt assembly supported on said chassis under said deflector;
   d. a transversely movable carriage supported from said chassis between said deflector and said first conveyor belt, said carriage capable of occupying either first or second positions, said carriage when in said first position extending across said first conveyor belt, and said carriage when in said second position, extending outwardly from said first conveyor belt towards said tree that is to be harvested;
   e. a pair of spaced transverse second conveyor belt assemblies supported from said carriage;
   f. a pair of movable power operated tree shakers supported from said carriage and disposed between said second conveyor belt assemblies;
   g. a pair of expandable sheet deflectors supported from said second conveyor belt assemblies, said sheet deflectors when expanded when said carriage is in said second position cooperating with said elongate deflector to define a continuous surface under the branches of the tree that is to be harvested, and said surface of such configuration that fruit shaken thereon rolls by gravity to said second conveyor belt assemblies;
   h. first means supported on said chassis for sizing fruit delivered thereto by said first conveyor belt assembly;
   i. second means for removably supporting said two containers from said chassis;
   j. third means for selectively discharging said sized fruit into a desired one of said containers;

k. first power means for moving said carriage between said first and second positions;

l. second power means for moving said shakers into pressure contact with opposite sides of a trunk of a tree when said carriage is in said second position;

m. third power means for driving said first and second conveyor belt assemblies, with said second conveyor belt assemblies transporting fruit shaken onto said surface to said first conveyor belt assembly, and said first conveyor belt assembly transporting said fruit to said first means where it is sized and subsequently delivered by said third means to a desired one of said containers.

2. A device as defined in claim 1 which in addition includes:

n. transverse laterally spaced rail means disposed under said deflector and above said first conveyor belt, with said rails means movably supporting said carriage; and o. fourth power means for pivoting said rails in a vertical plane relative to said chassis to permit said shakers and the most outwardly disposed ends of said second conveyors to be disposed at a desired elevation relative to the trunk of a tree that is to have fruit harvested therefrom.

3. A device as defined in claim 2 which in addition includes:

p. a plurality of spaced arms that extend outwardly in opposite directions from said carriage and serve to support said second conveyor belt assemblies at transverse angular positions thereon; and q. two laterally spaced, transverse rigid members pivotally supported from said carriage and having said shakers mounted on free ends thereof, and said second power means extending between said rigid members and connected thereto.

4. A device as defined in claim 2 which in addition includes:

p. a plurality of elongate angular supports pivotally mounted in upwardly extending positions from said second conveyor belt assemblies;

q. a plurality of pliable sheets secured to said supports and to said deflector; and r. fifth power means for pivoting said supports between said first and second positions, with said supports when said carriage is in said first position and said supports are in said first position supporting said sheets in a folded configuration substantially parallel to said chassis and said carriage when in said second position and said supports when in said second position disposing said sheets in an expanded configuration where they extend under a portion of the branches of the tree from which fruit is being harvested, and said sheets in said expanded configuration cooperating with said deflector to define a continuous surface under said branches onto which fruit falls by gravity when said tree is shaken by said shakers, with said continuous surface sloping towards said second conveyors so that fruit rolls by gravity to said second conveyors to be carried upwardly and onto said first conveyor.

5. A device as defined in claim 4 in which said first, second, third, fourth and fifth power means are hydraulically operated, and said device in addition including:

s. an engine and transmission for powering said wheel supported chassis;

t. a hydraulic pump operated by said engine; and u. conduit and valve means for selectively supplying hydraulic fluid under pressure from said pump to said first, second, third, fourth and fifth power means to operate the same.

6. A device as defined in claim 4 which in addition includes:

s. a plurality of elongate laterally spaced members that extend over at least a portion of said second conveyors, and said elongate members being so spaced that fruit rolling thereon from said deflector and expanded sheets must pass between spaces between said elongate members prior to falling by gravity onto said conveyors, and said elongate members and spaces therebetween cooperating to slow down the movement of said fruit onto said second conveyors as well as to distribute said fruit more evenly thereon.

7. A device as defined in claim 1 in which said second means are a plurality of substantially horizontally disposed forks that extend outwardly from said first end of said chassis and said device in addition including:

n. power means for moving said forks and said containers that are supported thereon vertically relative to said chassis.

8. A device as defined in claim 7 in which said third means includes:

o. a transverse chute pivotally supported in a fixed longitudinal position relative to said chassis, said chute capable of receiving sized fruit from said first means; and p. a weight longitudinally movable on said chute, with said weight when moved to an end portion of said chute, pivoting said chute to the extent that fruit discharged thereon from said first means rolls by gravity into a desired one of said containers.

9. A device as defined in claim 1 in which said first means is an endless roller supported belt disposed on a first end of said chassis below said first conveyor belt assembly and adapted to receive fruit therefrom, with said endless belt formed with a plurality of spaced openings therein through which undersized fruit may drop by gravity to the ground and said device in addition including:

n. means for driving said endless belt concurrently with said first conveyor belt assembly.

10. A device as defined in claim 4 in which said fifth power means includes:

s. two hydraulic cylinders, with each of said cylinders being pivotally supported from an outer end portion of one of said second conveyor belt assemblies, and said cylinders extending inwardly towards one another;

t. two piston rods slidably supported in said cylinders;

u. two lugs secured to two of said elongate angular supports;

v. ball and socket means for removably connecting said lugs to the free ends of said piston rods; and w. means for discharging hydraulic fluid under pressure into and out of the interior end portions of said cylinders to pivot said supports between said first and second positions.

11. A device as defined in claim 10 in which each of said second conveyor belt assemblies in addition includes:

x. two arms on the outer extremities thereof that extend inwardly towards one another, and with the ends of said hydraulic cylinders being pivotally supported on the end portions of said arms that are most adjacent to one another.

* * * * *